United States Patent
Colonna et al.

(10) Patent No.: US 7,072,722 B1
(45) Date of Patent: Jul. 4, 2006

(54) DIGITAL PROTECTION AND CONTROL DEVICE AND METHOD THEREOF

(75) Inventors: Donato Colonna, Milan (IT); Luciano Di Maio, Milan (IT)

(73) Assignee: ABB T&D Technology Ltd (CH)

( * ) Notice: Subject to any disclaimer, the term of this patent is extended or adjusted under 35 U.S.C. 154(b) by 460 days.

(21) Appl. No.: 10/432,377

(22) PCT Filed: Nov. 21, 2000

(86) PCT No.: PCT/EP00/11785

§ 371 (c)(1),
(2), (4) Date: May 21, 2003

(87) PCT Pub. No.: WO02/50971

PCT Pub. Date: Jun. 27, 2002

(51) Int. Cl.
*G05B 11/01* (2006.01)

(52) U.S. Cl. ............... 700/22; 700/21; 700/79; 700/286; 700/291; 700/295; 713/154; 713/155; 713/168; 713/300; 713/310

(58) Field of Classification Search .............. 700/21, 700/22, 23, 78, 79, 82, 81, 286, 287, 291, 700/295; 361/64, 115, 93.2, 94; 713/155, 713/154, 168, 176–179, 300, 320, 310
See application file for complete search history.

(56) References Cited

U.S. PATENT DOCUMENTS

| | | | |
|---|---|---|---|
| 3,973,240 A * | 8/1976 | Fong | 375/212 |
| 4,686,630 A * | 8/1987 | Marsland et al. | 700/296 |
| 4,945,443 A | 7/1990 | DeBiasi et al. | |
| 5,666,256 A | 9/1997 | Zavis et al. | |
| 5,886,647 A * | 3/1999 | Badger et al. | 340/825.69 |
| 5,982,596 A | 11/1999 | Spencer et al. | |
| 6,005,476 A * | 12/1999 | Valiulis | 340/310.11 |
| 6,317,028 B1 * | 11/2001 | Valiulis | 340/10.1 |
| 6,891,838 B1 * | 5/2005 | Petite et al. | 370/401 |

* cited by examiner

*Primary Examiner*—Ramesh Patel
(74) *Attorney, Agent, or Firm*—Connolly Bove Lodge & Hutz, LLP

(57) ABSTRACT

The present invention provides a digital protection and control (P & C) device for a power distribution network, which comprises a control unit and human-machine interface (HMI) for allowing a user access to the control unit. The control unit comprises a microprocessor that exchanges data information with the HMI. The digital P & C device, according to the present invention, further comprises a user authentication mechanism for regulating the access of a user to the control unit. This user authentication mechanism comprises an electronic authentication device, associable with the mentioned HMI, which stores first predefined data/information. This first predefined data/information comprises at least a user identification code, for establishing the identity of a user; and a user access code, for establishing the access mode of the user to the control unit. In addition, the electronic authentication device is able to communicate with the control unit, when it is associated with the HMI of the digital P & C device.

14 Claims, 2 Drawing Sheets

DIGITAL PROTECTION AND CONTROL DEVICE AND METHOD THEREOF

Figure 1:
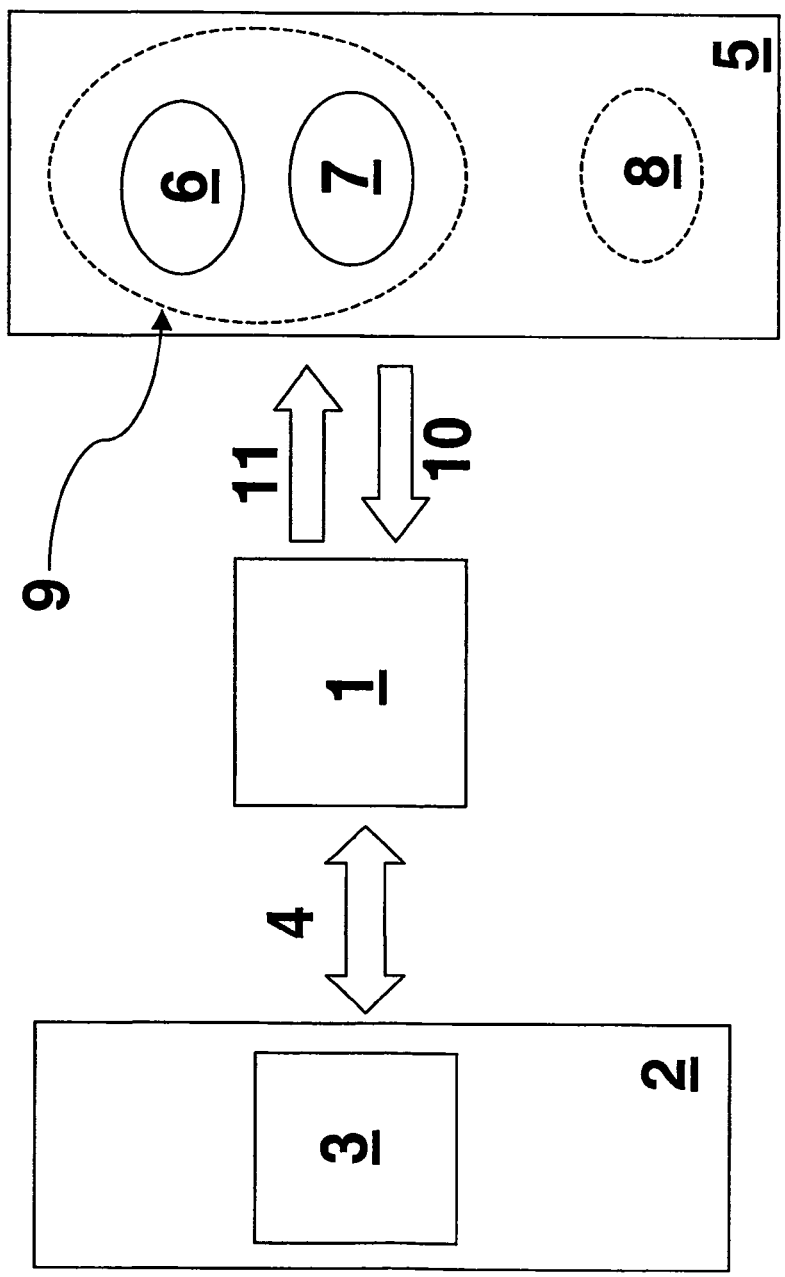

The present invention relates to an improved digital protection and control device for power distribution networks.

It is known that digital protection and control (P&C) devices are aimed at monitoring the operating state of a power distribution network and controlling the operation of primary equipment (e.g. tripping devices, disconnectors or the like), in relation to this monitoring activity. The functions of a digital P&C device are regulated by a control unit, which includes a microprocessor. Based on predefined processing strategies, the microprocessor provides for the digital generation of signals for regulating the functions of the digital P&C device.

A user is generally allowed to access to the control unit (e.g. in order to set up the most appropriate processing strategies) by means a human-machine interface (commonly called user-interface or HMI), included in the digital P&C device. An HMI is an electronic interface arrangement, generally provided with display and keyboard, which is accessible to the user. An HMI allows the user to program the functions of the digital P&C device, using predefined hardware buttons that allow accessing to suitable software menus. The HMI also can also display data/information regarding the status of the digital P&C device and, more in general, display the results of monitoring activity, which is run by the digital P&C device on the power distribution network.

It is known that the access to the control unit (i.e. to the functions of the digital P&C device) is not allowed to all the users. For reasons of safety and complexity, some functions of the digital P&C device require, in fact, the intervention of trained personnel. Therefore, there has always been the need of regulating (i.e. controlling/restricting) the access of a user to the digital P&C device. This need is satisfied by means of some user authentication mechanisms, which certify that a user is qualified to access to certain functions of the digital P&C, according to the most proper access mode.

Usually, two main user authentication mechanisms have been adopted, in the state of the art. A first user authentication mechanism, which is very common, consists substantially of the use of passwords that can be inserted by means of the HMI keyboard and display. A second user authentication mechanism consists of the use of mechanical keys that are inserted in suitable keyholes provided on the front panel of the HMI.

Unfortunately, these two user authentication mechanisms are characterized by some drawbacks.

In fact, the practice has shown that the use of passwords is often difficult, due to the limited resources of the HMI and cost, size and robustness constraints. Further, it is known that, sometimes, for example during the digital P&C device installation, it is needed to access several times to the digital P&C device functions. For the aim of saving time, the passwords that are used, in practice, are usually short and ensure a weak level of protection. Further, these passwords have to be explicitly communicated, every time, to the trained personnel. This fact represents an intrinsic weakness in terms of safety, too.

The use of mechanical keys is intrinsically a safer user authentication mechanism. Nevertheless, if a plurality of access modes has to be implemented, the need of providing the suitable different keyholes implies a relatively large occupation of space on the HMI front panel. This is often not acceptable due to the size constraints of the HMI front panel, which are generally difficult to satisfy. Further, the adopted keyholes, due to the insulation standards that are commonly required, must be sealed and, therefore, their arrangement is often costly.

Further, the known user authentication mechanisms do not allow easily understanding the identity of the users, who have previously had access to the control unit of the digital P&C device. Therefore, with the known user authentication mechanisms, it is difficult to trace back the access history to a certain digital P&C device. This tracing function might be important for safety purposes, but up to now it appears quite difficult to achieve with the described traditional user authentication mechanisms.

In short, one can say that the user authentication mechanisms of the state of the art do not ensure satisfactory performances both in terms of safety and in terms of easiness of use.

Therefore, the main aim of the present invention is to provide a digital P&C device, for a power distribution network, including a user authentication mechanism, which allows overcoming the drawbacks mentioned above.

Within this aim, another object of the present invention is to provide a digital P&C device, with a user authentication mechanism, which allows obtaining an improved safety of the user authentication procedures for accessing to the digital P&C device functions, without incurring, at the same time, in huge additional costs.

Another object of the present invention is to provide a digital P&C device, with a user authentication mechanism that allows obtaining additional safety functions such as the tracing of the access history of the digital P&C device.

Thus, the present invention provides a digital P&C device for a power distribution network, which comprises a control unit and HMI for allowing a user to access to the control unit. The control unit comprises includes a microprocessor that exchanges data/information with the HMI. The digital P&C device, according to the present invention, further comprises a user authentication mechanism for regulating the access of a user to the control unit. The digital P&C device, according to the present invention, is characterized in that the mentioned user authentication mechanism comprises an electronic authentication device, associable with the mentioned HMI, which stores first predefined data/information. This first predefined data/information comprises at least a user identification code, for establishing the identity of a user, and a user access code for establishing the access mode of a user to the control unit. Moreover, the mentioned electronic authentication device is able to communicate with the control unit, when it is associated to the HMI of the digital P&C device.

Figure 2:
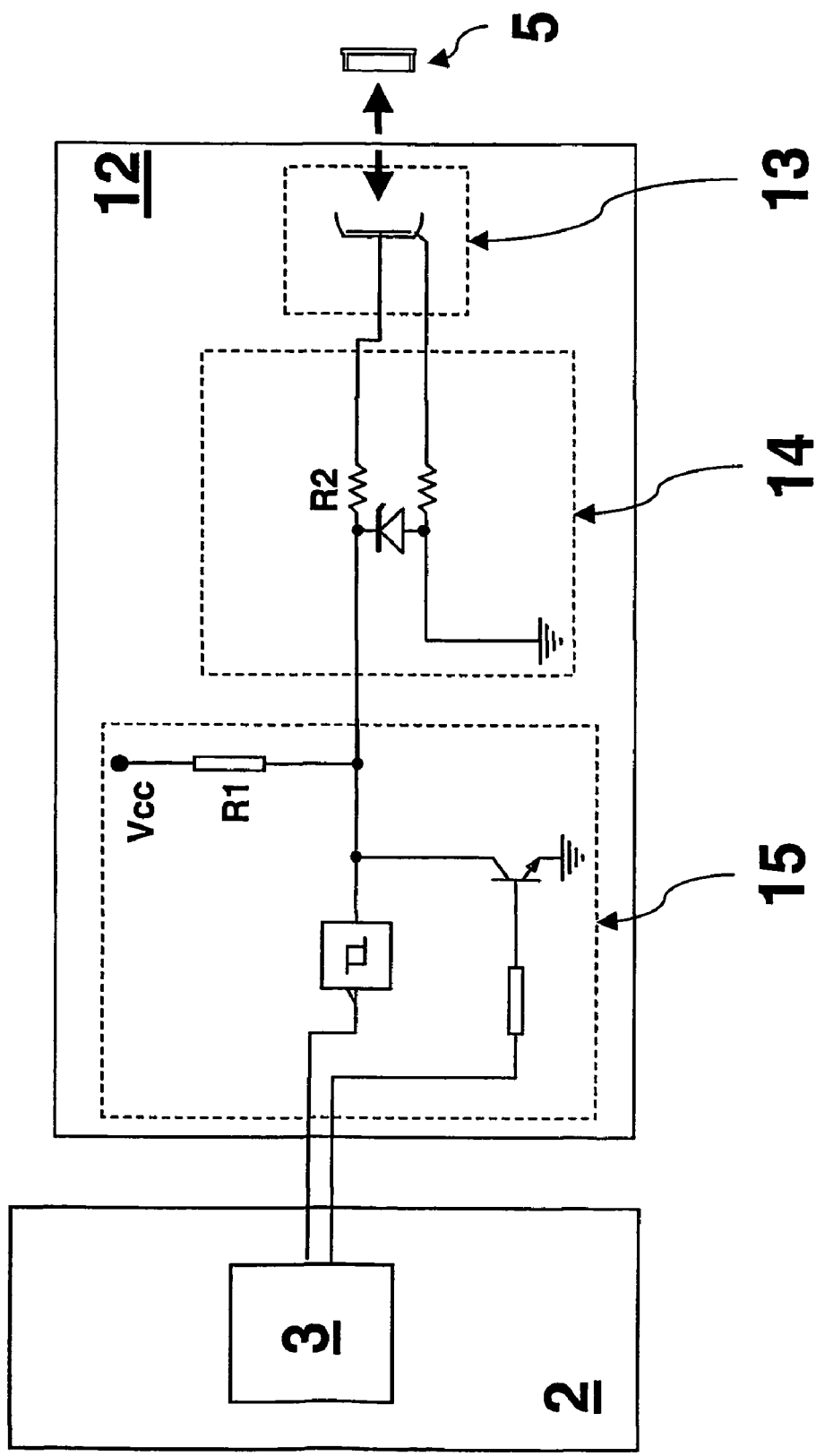

Further characteristics and advantages of the digital P&C device, according to the present invention will be better described hereinafter, with particular reference to the enclosed figures, in which:

FIG. 1 schematically illustrates a block diagram representing schematically the digital P&C device, according to the present invention; and FIG. 2 schematically illustrates a preferred embodiment of a portion of the P&C device, according to the present invention.

Referring now to FIG. 1, the digital protection and control device (P&C), according to the present invention, comprises a human-machine interface (HMI) 1 for allowing the access of a user to a control unit 2, included in the digital P&C device. The control unit 2 comprises a microprocessor 3 that exchanges data/information 4 with the HMI 1. The digital P&C device, according to the present invention, further comprises a user authentication mechanism for regulating the access of a user to the HMI 1.

The user authentication mechanism comprises an electronic authentication device 5. The user authentication device 5 stores first predefined data/information 9, which comprises at least a user identification code 6 for establishing the identity of the user. The first predefined data/information 9 further comprises a user access code 7 for establishing the access mode of the user to the control unit 2. The electronic authentication device 5 is able to communicate with the control unit 2, when it is associated to the HMI 1.

The electronic authentication device 5 comprises preferably also second predefined data/information 8, for configuring one or more functions of the digital P&C device.

The communication between the electronic authentication device 5 and the microprocessor 3 may preferably happen in two directions. Therefore, at least a portion 10 of the first predefined data/information 9 and/or the second predefined data/information 8 may be downloaded into the control unit 2, when the electronic authentication device 5 is associated to the HMI 1 (see the dotted arrow). Accordingly, at least a portion 11 of the data/information (not shown), which is processed by the control unit 2, may be uploaded into the electronic authentication device 5.

In a preferred embodiment of the present invention, illustrated in FIG. 2, the HMI 1 comprises preferably electronic interface means 12 for electrically interfacing the electronic authentication device 5 to the control unit and, in particular, with the microprocessor 3. Advantageously, the electronic interface means 12 comprise an electronic communication port 13, which is coupled to the electronic authentication device 5, when the electronic authentication device 5 is associated to the HMI 1.

In a preferred embodiment of the present invention, the communication port 13 is plugged and/or wired with the electronic authentication device 5, when the electronic authentication device is associated to the HMI 1. In this case, the communication port 13 may comprise a two-contact metallic pad (not shown), to which is mounted on the front panel of the HMI 1. The electronic authentication device 5 may be plugged or wired with the two-contact metallic pad, in order to create a hardware communication channel between the microprocessor 3 and the electronic authentication device 5. For this scope, the electronic authentication device 5 might comprise an electronic chip, included in a disk-shaped package. The electronic authentication device 5 may be coupled with communication port 13, 1 also without having a physical plug, i.e. according to a wireless mode.

In this case, the communication port 13 may comprise first electronic means (not shown) for transmitting/receiving data/information respectively to or from second electronic means (not shown), that are installed aboard the electronic authentication device 5.

Advantageously, the electronic interface means 12 further comprise an electronic protection circuit 14, which is electrically connected to the communication port 13. The electronic protection circuit 14 is mainly aimed at protecting the communication between the microprocessor 3 and the electronic authentication device 5 from electrical disturbances. These disturbances might damage the electronic authentication device 5 or the microprocessor 3 or could alter the exchanged data/information. The electronic protection circuit 14 may be realized, in practice, according to various electronic schemes, such that one illustrated in FIG. 2, which are within the knowledge of the skilled artisan. Preferably, the electronic interface means 12 comprise also an electronic logic interface circuit 15, which is electrically connected between the electronic protection circuit 13 and the microprocessor 3. The electronic logic interface circuit 15 allows establishing a digital communication between the microprocessor 3 and the electronic authentication device 5. Also the electronic logic interface circuit 15 may be realized according to different schemes, such that one illustrated in FIG. 2, which are known in the state of the art.

In a preferred embodiment of the digital P&C device, according to the present invention, the electric power, which is necessary to the electronic authentication device 5 for operating, may be supplied directly by the electronic interface means 12. For this aim, the electronic interface means 12 may comprises power supply means, electrically connected to the communication port 13. In case of a wired/plugged connection between the user authentication device 5 and the communication port 13, the mentioned power supply means may comprise (see FIG. 2) the resistors R1 and R2 and the power supply Vcc.

Alternatively, in case of wireless connection, the power supply means may be represented by a transponder circuit (not shown), which generates an electromagnetic field in an activation region relatively close to the communication port 13. In the activation region, the electromagnetic field is provided with a certain amount of energy. This amount of energy may be used by the user authentication device 5, when the user authentication device 5 is brought within the activation region, for associating it with the HMI 1. For this aim, the user authentication device 5 may comprise a simple circuit, which is able to link the lines of the generated electromagnetic field, within the activation region.

In both the described cases, the mentioned power supply means are particularly advantageous since it allows avoiding the use of a dedicated battery inside the electronic authentication device 5, with a remarkable reduction of costs.

The digital P&C device, according to the present invention allows adopting an improved user authentication method, which comprises, preferably, the steps that are described in the following, with reference to FIGS. 1 and 2.

In a preliminary interrogation step, the microcontroller 3 checks iteratively if said electronic authentication device is associated to the HMI 1. In practice, the microcontroller 3 sends to the communication port 13 a message requiring a presence response message, in case the electronic authentication device 5 is connected 8 with the communication port 13, according to one of the modes described above.

Once the electronic authentication device 5 is connected with the communication port 13, it sends to the microcontroller 3, in a preliminary response step, a message indicative of its presence. In this manner, the microcontroller 3 is aware that the electronic authentication device is associated to the HMI 1 and, therefore, that a communication can take place.

At this point, the basic steps of the preferred authentication method for use in a digital P&C device, according to the present invention, can be performed.

In an interrogation step, the microcontroller 3 sends to the electronic authentication device 5 a request message for requiring the user identification code 6 and the access code 7. In a response step, the electronic authentication device 5, after having received the request message, provides the microcontroller 3 with the user identification code 6 and the access code 7.

Then, in a storage step, the microcontroller 3 stores in the control unit 2 the user identification code 6. The storage of the user identification code 6 may happen into predefined non-volatile storage means (not shown), included in the control unit 2. Subsequently, a checking step, in which the microcontroller 3 establishes the correct access mode of the user to the HMI 1, may be run. The mentioned checking step comprises preferably one or more of the sub-steps that are described in the following. First, a selection sub-step may be performed. In this selection sub-step, the microcontroller 3 selects a predefined set of stored access codes (not shown) from the control unit 2. The predefined set of stored access codes corresponds to available access modes to the functions of the digital P&C device. Of course, various access modes and, therefore, various sets of predefined stored access codes may be created, according to the needs. For example, an access mode having a low privilege might imply the only possibility of reading data stored in the control unit 2, while an access mode having a high privilege may imply the possibility of modifying the access privileges or setting the digital P&C device control strategies. Subsequently, in an execution sub-step, the microcontroller may command the HMI 1 to display the correct access mode, which provides the user with the related access privileges to the functions of the digital P&C device. Alternatively, if problems occur, an alarm sub-step, in which the microcontroller 3 commands the HMI 1 to display an error message, is executed. The verification may be executed, basing on the user code 6. In this case, a verification sub-step may be performed. In this verification sub-step, the microcontroller 3 checks the correspondence between the access code 7 with a predefined number of stored access codes, basing on the user code 6. In an alternative error sub-step the microcontroller 3 verifies the non-correspondence of the access code 7 with one of the stored access codes, basing on the user code 6.

This sequence of sub-steps of the authentication method for use in the digital P&C device, according to the present invention, is particularly useful. In fact, it allows assigning to a certain user the correct access mode and, therefore, the correct access privileges.

As mentioned, the user identification code 6 is memorized in the control unit 2, each time an access is requested to the microcontroller 3. This fact allows performing a tracing step, in which the microcontroller is able to trace back a predefined number of previous accesses to the HMI 1. Accordingly, the microcontroller 3 commands the HMI 1 to display a list describing the to mentioned predefined number of previous accesses. In practice, every access to the HMI 1 may be documented. This is quite useful because, for example, it allows easily reconstructing the access history of the digital P&C device and, if needed, understanding the previous modifications to the functions of the digital P&C device, according to the present invention.

The fact that a communication channel is, in practice, established between the microcontroller 3 and the electronic authentication device 5, allows also to obtain capabilities that were not possible with the traditional authentication mechanism. Therefore, an improved method for operating a digital P&C device, according to the present invention, is possible.

This improved method may comprise a download step, in which the electronic authentication device 5 downloads at least a portion of the second predefined data/information 8 to the control unit 2. In this manner, predefined configuration codes might be easily downloaded into the control unit 2 and, therefore, the user authentication device might be used as a carrier of data/information that have to be stored/used by the control unit 2.

Accordingly, also an upload step, in which the electronic authentication device uploads into predefined storing means (not shown) at least a portion of the data/information processed by the control unit 2, may be performed, advantageously. In this manner, the user authentication device might be used as a carrier of data/information retrieved on the field, directly from the digital P&C device.

The digital P&C device, according to the present invention, allows achieving the intended aims and objects.

In fact, the use of an electronic authentication device 5 allows performing improved authentication procedures, which ensure a high level of safety. The identity of a certain user, together with the suitable access privileges, is unequivocally identified with a high level of reliability.

Moreover, a high level of flexibility is ensured, since the user identification code, the user access code and the set of predefined access codes may be programmed, according to the needs.

Further, several additional functions, such as the continues up-dating of a tracing log-file, are possible. By means of the continuos up-dating of a tracing log-file it is possible to easy document the operation history of the digital P&C device, according to the present invention. By means of the up-loading/down-loading capabilities, the electronic authentication device 5 might be used also as a configuration tool and, therefore, it is possible to adopt, easily, customized configuration codes that can be set-up separately, according to the needs.

Further, the user identification code 6 and the user access code 7 allow adopting a single communication port 13, into which different electronic authentication devices may be plugged. This allows saving remarkable space of the HMI 1 front panel and, therefore, saving a remarkable amount of installation costs.

The digital P&C device, according to the present invention, thus conceived is susceptible of numerous modifications and variations, all of which are within the scope of the inventive concept. All the details may also be replaced with other technically equivalent elements. In practice, the materials employed, so long as they are compatible with the specific use, as well as the dimensions, may be any, according to the requirements and to the state of the art

The invention claimed is:

1. A digital protection and control device for a power distribution network, comprising:
    a control unit including a microprocessor;
    a human-machine interface for allowing a user to access said control unit, said microprocessor exchanging data/information with said human-machine interface; and
    a user authentication mechanism for regulating the access of the user to said control unit,
    wherein said user authentication mechanism comprises an electronic authentication device associable to said human-machine interface, and
    wherein said electronic authentication device is configured for:
    storing first predefined data/information comprising at least a user identification code for establishing the identity of a user and a user access code for establishing the access mode of a user in said control unit;
    storing second predefined data/information for configuring one or more functions of said digital protection and control device in said electronic authentication device; and
    communicating with said control unit, when said electronic authentication device is associated with said human-machine interface, at least one of a portion of said first predefined data/information and a portion of said second predefined data/information being downloaded into said control unit when said electronic authentication device communicates with said control unit.

2. A digital protection and control device, according to claim 1, wherein at least a portion of the data/information, which is processed by said control unit, is uploaded into said electronic authentication device, when said electronic authentication device communicates with said control unit.

3. A digital protection and control device, according to claim 1, wherein said human-machine interface comprises electronic interface means for electrically interfacing said electronic authentication device with said control unit, when said electronic authentication device is associated to said human-machine interface.

4. A digital protection and control device, according to claim 3, wherein said electronic interface means comprise an electronic communication port for hosting said electronic authentication device, when said electronic authentication device is associated to said human-machine interface.

5. A digital protection and control device, according to claim 3, wherein said communication port is plugged and/or wired with said electronic authentication device when said electronic authentication device is associated to said human-machine interface.

6. A digital protection and control device, according to claim 3, wherein said communication port is wireless connected with said electronic authentication device, when said electronic authentication device is associated to said human-machine interface.

7. A digital protection and control device, according to claim 3, wherein said electronic interface means further comprise:
an electronic protection circuit electrically connected to said communication port; and
an electronic logic interface circuit electrically connected between said electronic protection circuit and said microprocessor.

8. A digital protection and control device, according to claim 3, wherein said electronic interface means comprises power supply means, electrically connected to said communication port, said power supply means supplying power to said electronic authentication device, when said electronic authentication device is associated to said human-machine interface.

9. A digital protection and control device, according to claim 3, wherein said digital protection and control device performs a user authentication method comprising the following steps:
an interrogation step, in which said microcontroller sends to said electronic authentication device a request message requiring said user identification code and said access code; and
a response step, in which said electronic authentication device, after having received said request message, sends to said microcontroller said user identification code and said access code; and
a storage step, in which said microcontroller stores into storage means of said control unit said user identification code; and
a checking step, in which said microcontroller establishes the access mode of a user to said human-machine interface.

10. A digital protection and control device, according to claim 9, wherein said checking step further comprises the following sub-steps:
a selection sub-step, in which said microcontroller selects a predefined set of stored access codes from said control unit; and
an execution sub-step, in which said microcontroller commands said human-machine interface to display an access mode, which is suitable for a user; or
an alarm sub-step, in which said microcontroller commands said human-machine interface to display an error message, if problems occur.

11. A digital protection and control device, according to claim 9, wherein said checking step further comprises one of the following sub-steps, alternatively:
a verification sub-step, in which said microcontroller verifies the correspondence of said access code with one of said stored access codes, basing on said user code; or
an error sub-step, in which said microcontroller verifies the non-correspondence of said access code with one of said stored access codes, basing on said user code.

12. A digital protection and control device, according to claim 9, wherein said user authentication method further comprises the following preliminary steps:
a preliminary step, in which said microcontroller checks iteratively if said electronic authentication device is associated to said human-machine interface; and
a preliminary response step, in which said electronic authentication device, when associated to said human-machine interface, sends a message of presence to said microcontroller.

13. A digital protection and control device, according to claim 9, wherein said user authentication method further comprises the following step:
a tracing step, in which said microcontroller traces back a predefined number of previous accesses to said human-machine interface and commands said human-machine interface to display a list comprising said predefined number of previous accesses.

14. A method for operating a digital protection and control device, according to claim 1, further comprising the following steps:
a download step, in which said electronic authentication device downloads at least a portion of said second predefined data/information into said control unit; and/or
an upload step, in which said electronic authentication device uploads into predefined storing means at least a portion of the data/information that are processed in said control unit.

* * * * *

UNITED STATES PATENT AND TRADEMARK OFFICE
CERTIFICATE OF CORRECTION

| | |
|---|---|
| PATENT NO. | : 7,072,722 B1 |
| APPLICATION NO. | : 10/432377 |
| DATED | : July 4, 2006 |
| INVENTOR(S) | : Donata Colonna et al. |

Page 1 of 1

It is certified that error appears in the above-identified patent and that said Letters Patent is hereby corrected as shown below:

Title Page;
Please correct section (73) Assignee to read as follows:

ABB TECHNOLOGY AG (CH)

Signed and Sealed this

Twenty-first Day of September, 2010

David J. Kappos
*Director of the United States Patent and Trademark Office*